June 14, 1927.

F. H. VAN HOUTEN

DOUGH MOLDER

Filed Sept. 10, 1926

Inventor
Frank H. VanHouten
By
his Attorneys

June 14, 1927.

F. H. VAN HOUTEN

DOUGH MOLDER

Filed Sept. 10, 1926

Inventor
Frank H. Van Houten
By Church & Church
His Attorneys

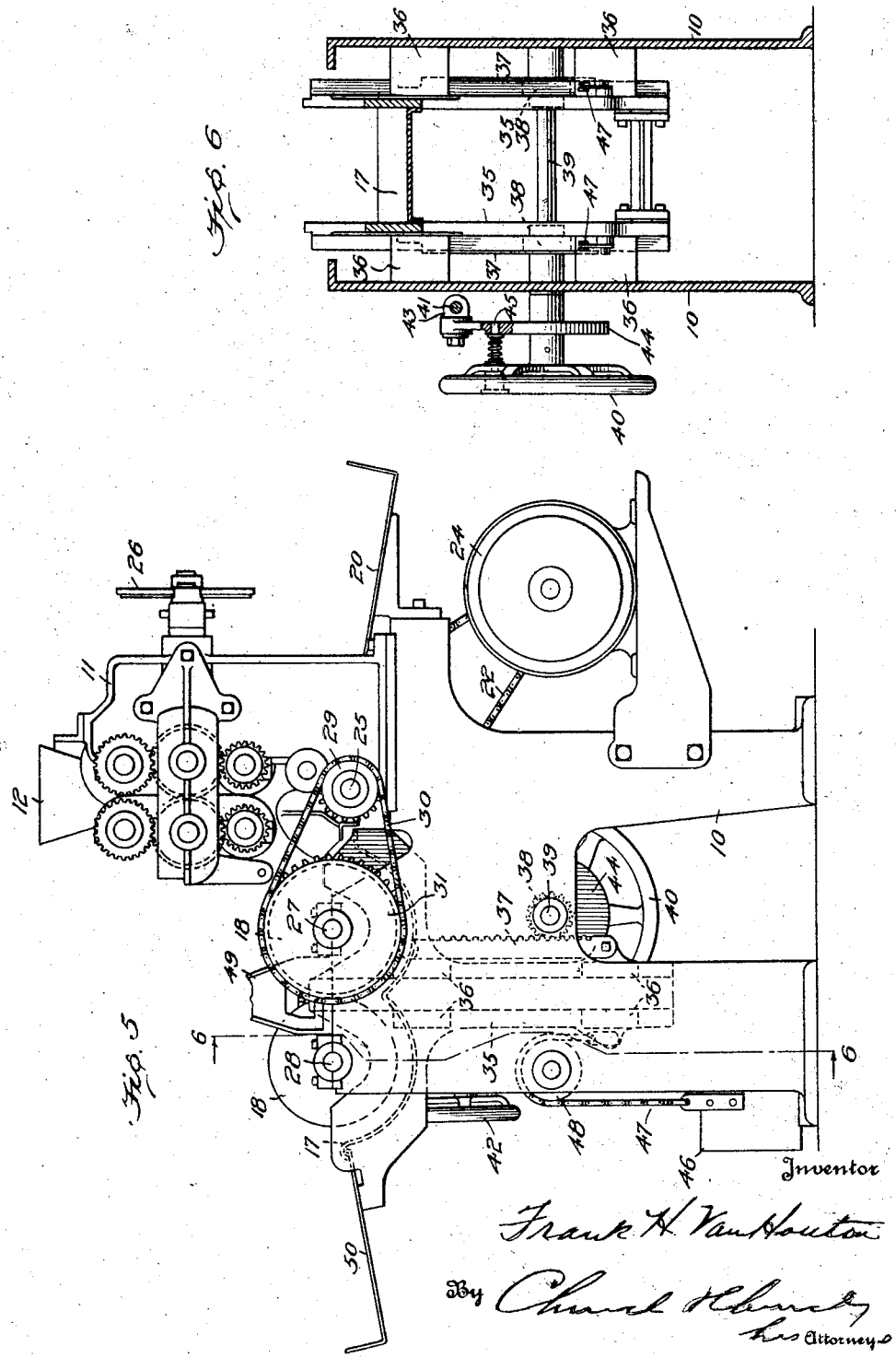

Patented June 14, 1927.

1,631,992

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

DOUGH MOLDER.

Application filed September 10, 1926. Serial No. 134,638.

This invention relates to improvements in dough handling apparatus, and specifically to that type of machine known to the trade as a dough molder.

In the present machine, the dough is acted upon by one or more rotatable drums so positioned relatively to a pressure plate that the lumps of dough passing between said drums and pressure plate will be molded, and the primary object of the present invention is to provide a comparatively simple arrangement whereby the pressure plate may be either adjusted minute distances toward and from the drums, or it may be rapidly moved a comparatively great distance from said drums so that ready access may be had thereto for the purpose of washing and cleaning. Preferably, the machine is so constructed that the pressure plate may be moved relatively to the drums, as it would entail considerably more expense in the production of the machine if the drums were adapted to be adjusted or moved toward and from the pressure plate.

With these and other objects in view, the invention consists in certain details of construction and combinations and arrangements of parts all as will hereinafter be more fully described and the novel features thereof particularly pointed out in the appended claims.

In the accompanying drawings:—

Fig. 5 is an elevation of the machine as seen from the side opposite to that shown in Fig. 3; and Fig. 6 is a sectional view on the line 6—6 of Fig. 5.

Figure 1:
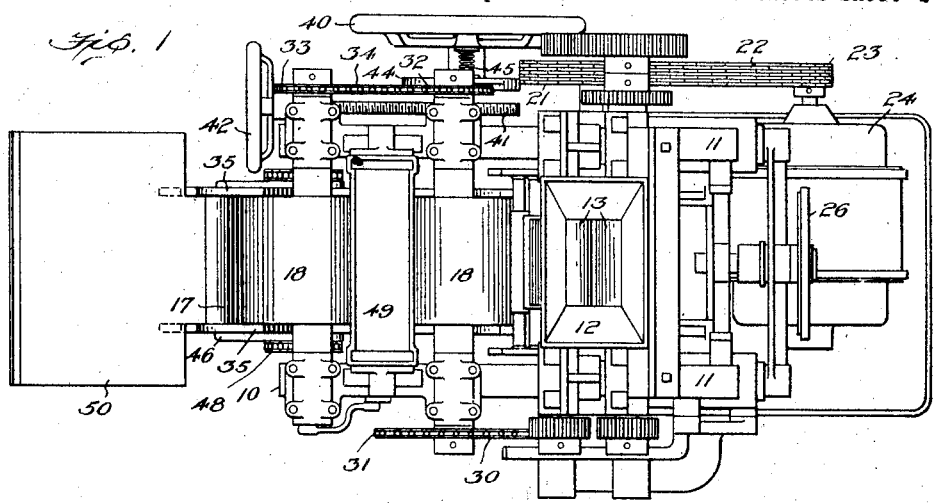
Figure 1 is a top plan view of the machine embodying the present improvements.

While the invention is applicable to various types of apparatus, the dough molder shown in the present instance comprises a main frame 10 having an upper frame section 11, on which is mounted the hopper 12, for delivering lumps of dough to the upper sheeting rolls 13, from whence said lumps pass downward to the sheeting rolls 14. The sheets of dough passing below the sheeting rolls 14 encounter a curling roller 15 and are rolled up in a series of convolutions 16. If the sheet of dough passing below the sheeting rolls 14 is not of excessive size, the curled lump of dough 16 will drop off of the curling roller 15 onto the pressure plate 17, but if such lump should be of excessive size, it will, after passing between rolls 14, be curled by roll 15 assisted by roll 19, and will continue to increase in diameter as it is rolled, until it strikes double catcher plate 51, which causes that portion of the lump to stop immediately, but as curling roll 19 is still in action, the dough is picked up by roll 19 and forced through the space between double catcher plate 51 and roll 19 and is deposited on plate 20. The main driving connections for the machine comprise chain wheel 21, driven by a chain 22 from the wheel 23, which is mounted on the driven shaft of the motor 24. Wheel 21 is mounted on the shaft 25 of the curling rollers 15, and by suitable driven gears and idlers, rotary motion is imparted to the roller 19 and the sheeting rollers 13, 14. Each pair of sheeting rollers 13, 14 are adjustable toward and from each other by the hand wheel 26. A further description of these sheeting rollers and curling rollers, the means for adjusting the sheeting rollers, and the driving connections for all of said rollers, is deemed unnecessary in the present instance, as such elements form no part of the present invention. However, for a more complete description of these various portions of the machine, reference is made to applicant's co-pending application, Serial No. 105,179.

Figure 2:
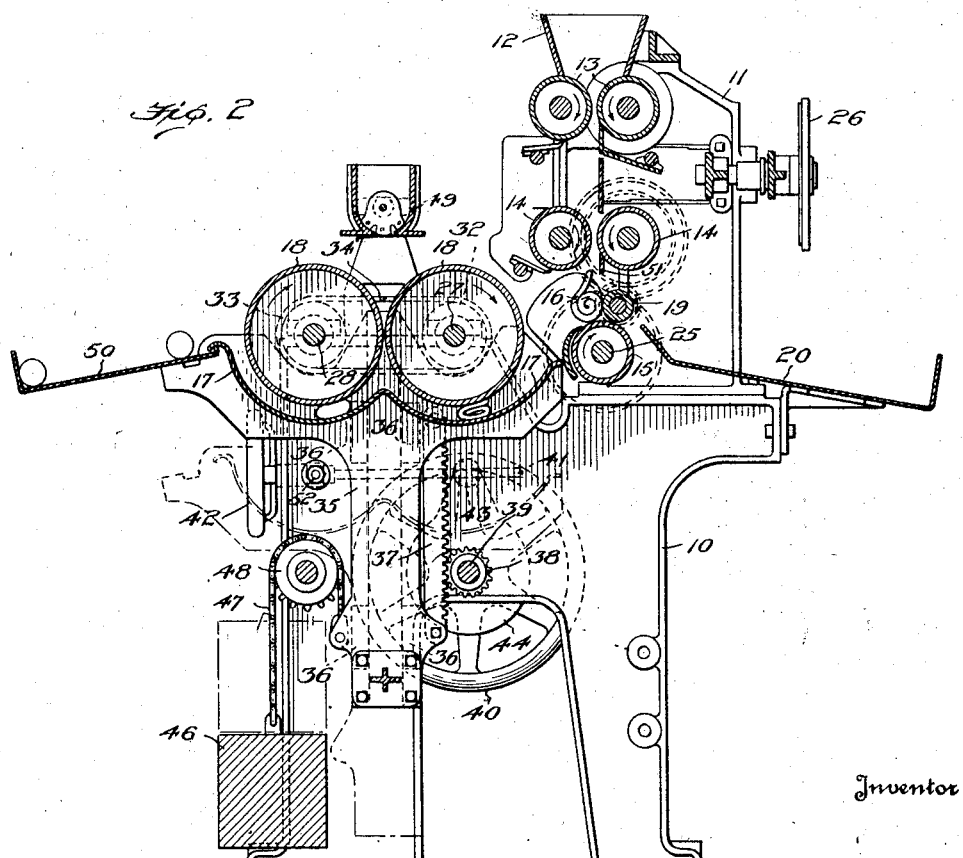
Fig. 2 is a longitudinal section taken from one side of the machine.
Figure 3:
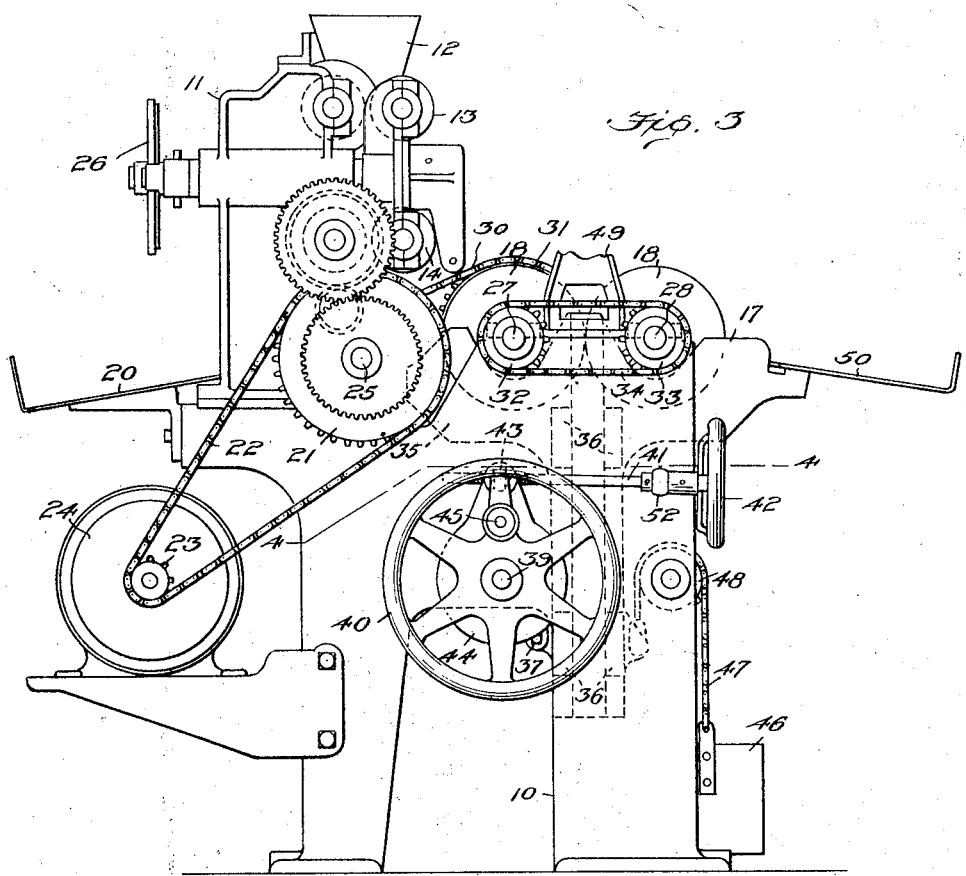
Fig. 3 is an elevational view from the opposite side of the machine.
Figure 4:
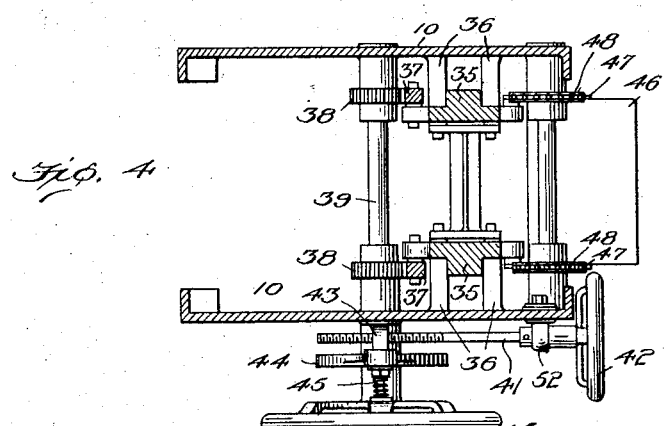
Fig. 4 is a horizontal sectional view on the line 4—4 of Fig. 3.

In the present type of machine, where the pressure plate is to be adjusted toward and from the drums 18 instead of having the drums adjustable toward and from said pressure plate, the drums are mounted on shafts 27, 28, journaled in the main frame of the machine. Shaft 27 is driven from shaft 25 through a sprocket 29 on said shaft 25, chain 30 and sprocket 31 on the shaft 27 at one side of the machine. At the opposite side of the machine, shaft 27 carries a sprocket 32, which is connected to the sprocket 33 on shaft 28 by the sprocket chain 34. These connections cause both of the drums to be positively driven. In order that the pressure plate 17 may be moved toward and from the drums 18, said plate has depending side portions 35, slidably held in guides 36, formed on the main frame 10 of the machine, and in accordance with the present invention said plate is adapted to be adjusted in said guides either minute distances or, for instance, where it is desired to have access to the entire plate for cleansing purposes, said plate may be moved a considerable distance below the drums 18, as shown in dotted lines in Fig. 2. The preferred arrangement for thus adjusting the pressure plate either comparatively small or comparatively large distances, consists in having racks 37 carried by the side portions of the pressure plate and engaging gears 38, mounted on a shaft 39, extending transversely of the machine frame. Mounted on said shaft 39 is a hand wheel 40 by means of which the shaft and gears 38 may be rotated rapidly, whereby, through said gears and the racks 37, the pressure plate may be raised and lowered considerable distances at a comparatively high rate of speed.

In addition to the hand wheel 40 for rotating shaft 39, means are also provided for rotating said hand wheel comparatively short distances at comparatively low speed for obtaining more or less minute adjustment of the pressure plate 17 toward and from the drums 18. While such means may take various forms, for the sake of simplicity it is preferred that this result be accomplished by a screw 41, journaled in a swivel bearing 52 which, in turn, is journaled in the frame 10 of the machine, and provided at its end on the exterior of the frame with a hand wheel 42 for rotating the same, the inner end of said screw having a threaded engagement with a swivel nut 43, carried by a disk 44, which is journaled on the shaft 39 and which has a releasable interlocking connection with the hand wheel 40. This interlocking between the disk 44 and the hand wheel 40 may consist of a spring pressed pin or plunger 45, engaging in a recess in the hand wheel 40. When it is desired to secure minute adjustment of the pressure plate the hand wheel 42 and screw 41 are rotated, thus imparting a slight rotary motion to the disk 44 and said disk being locked to the hand wheel 40 by the plunger 45, said hand wheel 40 and the shaft 39 will be rotated a comparatively short distance at a low rate of speed and consequently by means of the gears 38 and the racks 37 the pressure plate will also be adjusted a comparatively short distance toward or from the drums 18, depending upon the direction in which the hand wheel 42 has been turned.

Should it be desired to lower the pressure plate a considerable distance in order that it may be washed and cleansed, the plunger 45 is withdrawn from the recess in the hand wheel 40 and said hand wheel is then rotated as rapidly as desired, the shaft 39 under these circumstances being free to turn independently of the disk 44. This rapid rotation of the shaft 39 will result in the pressure plate being quickly lowered to the desired position. In order to reduce the load imposed upon the hand wheels in elevating the pressure plate, a counter balance 46 is connected by chains 47, extending over sprockets 48, to the frame of the pressure plate.

To prevent the lumps of dough adhering to the drums 18, said drums are adapted to be dusted with flour from the distributor 49 in the upper portion of the machine. The lumps of dough, after passing between the drums 18 and the pressure plate 17, are delivered to a catcher plate 50 from whence they pass to other apparatus for further treatment.

I claim:

1. In a dough molding machine, the combination of a pressure plate, drums cooperating with said plate for molding the dough, means for adjusting said plate toward and from said drums at one rate of speed, and a second adjusting means for moving the plate toward and from the drums at an increased rate of speed.

2. In a dough molding machine, the combination of a pressure plate, drums cooperating with said plate for molding the dough, means for adjusting said plate toward and from said drums at one rate of speed, a second adjusting means for moving the plate toward and from the drums at an increased rate of speed, and releasable means for interlocking both of said adjusting means.

3. In a dough molding machine, the combination of the machine frame, a pressure plate slidable in said frame, a plurality of drums cooperating with said plate, a shaft journaled in said frame, connections between said shaft and pressure plate for reciprocating said plate upon rotation of the shaft, means for rotating said shaft to impart comparatively minute movements of said pressure plate and means for rotating said shaft to impart increased movements to said plate.

4. In a dough molding machine, the combination of the machine frame, a pressure plate slidable in said frame, a plurality of drums cooperating with said plate, a shaft journaled in said frame, connections between said shaft and pressure plate for reciprocating said plate upon rotation of the shaft, a hand wheel mounted on said shaft for imparting a rotary movement thereto at a comparatively high speed, and a second hand wheel connected to said shaft for rotating the latter at a comparatively low rate of speed.

5. In a dough molding machine, the combination of the machine frame, a pressure plate slidable in said frame, a plurality of drums cooperating with said plate, a shaft journaled in said frame, connections between said shaft and pressure plate for reciprocating said plate upon rotation of the shaft, a hand wheel mounted on said shaft for imparting a rotary movement thereto at a comparatively high speed, and a second hand wheel releasably interlocked with the first hand wheel for rotating the shaft at a comparatively low speed.

6. In a dough molding machine, the combination of the machine frame, a pressure plate slidable in said frame, a plurality of drums cooperating with said plate, a shaft journaled in said frame, connections between said shaft and pressure plate for reciprocating said plate upon rotation of the shaft, a hand wheel mounted on said shaft for rotating the latter at a comparatively high speed, a disk journaled on said shaft, a releasable interlocking connection between said disk and hand wheel, and means for rotating said disk at a comparatively low rate of speed.

7. In a dough molding machine, the combination of the machine frame, a pressure plate slidable in said frame, a plurality of drums cooperating with said plate, a shaft journaled in said frame, connections between said shaft and pressure plate for reciprocating said plate upon rotation of the shaft, a hand wheel mounted on said shaft for rotating the latter at a comparatively high speed, a disk journaled on said shaft, a spring pressed plunger on said disk adapted to engage in a recess in said hand wheel, a swivel nut on said disk, a screw engaging said swivel nut, and means for rotating said screw to impart a rotary motion to said disk.

FRANK H. VAN HOUTEN.